(12) United States Patent
Wabel

(10) Patent No.: US 12,447,247 B2
(45) Date of Patent: Oct. 21, 2025

(54) DIALYSIS SYSTEM WITH CONTINUOUS GLUCOSE MONITORING

(71) Applicant: FRESENIUS MEDICAL CARE DEUTSCHLAND GMBH, Bad Homburg (DE)

(72) Inventor: Peter Wabel, Rosbach (DE)

(73) Assignee: FRESENIUS MEDICAL CARE DEUTSCHLAND GMBH, Bad Homburg (DE)

( * ) Notice: Subject to any disclaimer, the term of this patent is extended or adjusted under 35 U.S.C. 154(b) by 500 days.

(21) Appl. No.: 17/771,076

(22) PCT Filed: Oct. 23, 2020

(86) PCT No.: PCT/EP2020/079958
§ 371 (c)(1),
(2) Date: Apr. 22, 2022

(87) PCT Pub. No.: WO2021/078975
PCT Pub. Date: Apr. 29, 2021

(65) Prior Publication Data
US 2022/0370695 A1 Nov. 24, 2022

(30) Foreign Application Priority Data
Oct. 25, 2019 (DE) ...................... 10 2019 128 847.9

(51) Int. Cl.
*B01D 61/00* (2006.01)
*A61M 1/14* (2006.01)
(52) U.S. Cl.
CPC ......... *A61M 1/14* (2013.01); *A61M 2230/201* (2013.01)

(58) Field of Classification Search
CPC ...... B01D 61/00; B01D 61/24; B01D 61/243; B01D 61/244; B01D 61/246;
(Continued)

(56) References Cited

U.S. PATENT DOCUMENTS

2012/0296253 A1 11/2012 Mathews et al.
2014/0148749 A1* 5/2014 Petisce .................... A61M 1/14
604/5.01
(Continued)

FOREIGN PATENT DOCUMENTS

EP 2 859 911 A1 4/2015

OTHER PUBLICATIONS

Am J Nephrol. 1982;2(4):189-94. doi: 10.1159/000166644 Abstract (Year: 1982).*
(Continued)

*Primary Examiner* — Allison G Fitzsimmons
(74) *Attorney, Agent, or Firm* — Kilyk & Bowersox, P.L.L.C.

(57) ABSTRACT

The invention relates to a system for carrying out dialysis treatment with a dialysis machine, a control unit and a sensor, the sensor being signal-connected to the control unit, and the control unit being designed to measure a patient's blood sugar level or interstitial glucose value during dialysis treatment using the sensor, to record a curve over time of the blood sugar level or interstitial glucose values on the basis of the measured values, and to adapt one or more treatment parameters of the dialysis machine automatically taking the curve into account, or to output an instruction for adaptation of a treatment parameter by a user or for another action by a user.

10 Claims, 2 Drawing Sheets

Figure 1:
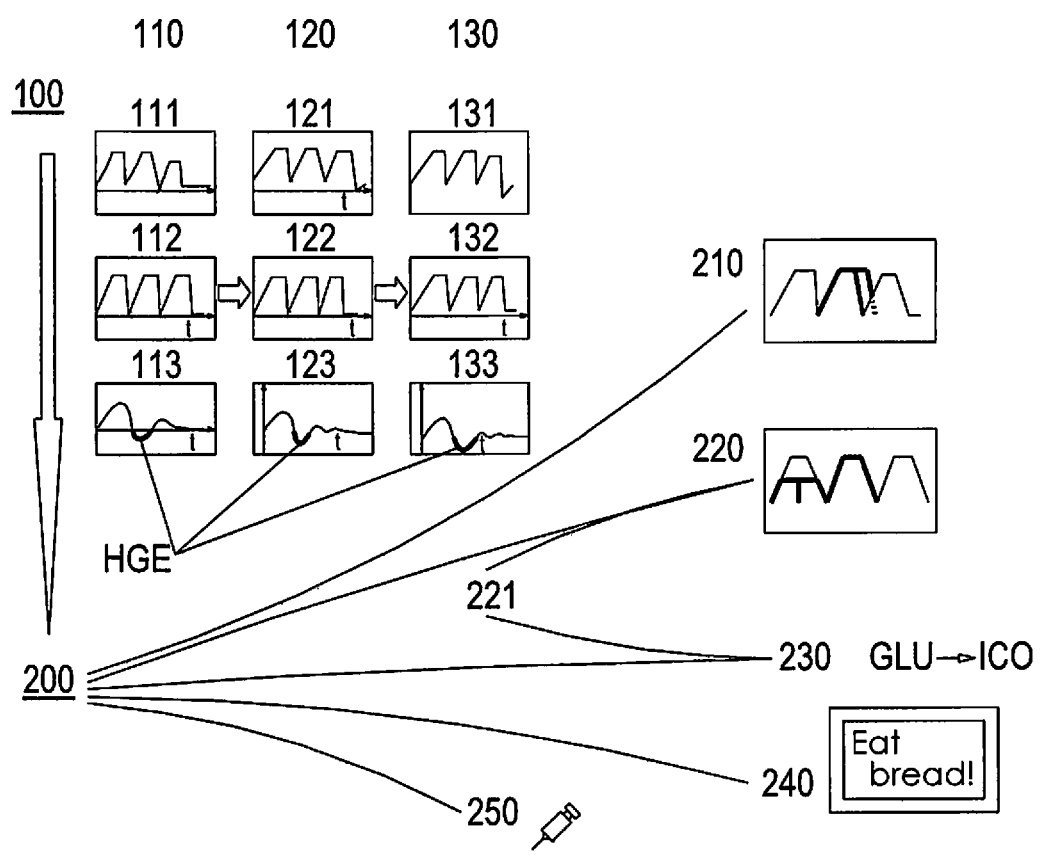

(58) Field of Classification Search
CPC .... B01D 61/2461; B01D 61/28; B01D 61/30; B01D 61/32; B01D 2221/10; A61B 68/6801; A61B 68/6802; A61B 68/6813; A61B 68/5846; A61M 1/14; A61M 1/28; A61M 1/281; A61M 1/282; A61M 1/284; A61M 1/287

See application file for complete search history.

(56) References Cited

U.S. PATENT DOCUMENTS

| | | | |
|---|---|---|---|
| 2015/0164370 A1* | 6/2015 | Wabel | A61M 1/14 604/28 |
| 2018/0043078 A1* | 2/2018 | Gerber | A61M 1/1613 |
| 2018/0263511 A1 | 9/2018 | Burnes et al. | |
| 2019/0083011 A1 | 3/2019 | Burnett et al. | |
| 2020/0030517 A1* | 1/2020 | Basati | A61M 1/28 |

OTHER PUBLICATIONS

Hindawi Publishing Corporation Journal of Sensors vol. 2016, Article ID 8943095, 8 pages http://dx.doi.org/10.1155/2016/8943095 (Year: 2015).*

Cengiz et al., Diabetes Technology & Therapeutics vol. 11, Supplement 1, 2009 DOI: 10.1089 dia.2009.0002 (Year: 2009).*

German Search Report.

* cited by examiner

DIALYSIS SYSTEM WITH CONTINUOUS GLUCOSE MONITORING

The invention relates to a system for carrying out a dialysis treatment that provides a continuous monitoring of the blood glucose level of a treated patient (CGM=continuous glucose monitoring).

The glucose molecule has a molecular mass of approximately 180 g/mol and does not bind to plasma proteins. It can therefore diffuse through the membrane of a dialysis filter (hemodialysis) or through the peritoneum (peritoneal dialysis) in a simple manner during a dialysis treatment, which can result in a rise or fall of the blood glucose level depending on the gradient.

The risk of dialysis-induced hypoglycemia is particularly high in patients having poor dietary intake, reduced gluconeogenesis, or reduced insulin release. A study has shown that on the day of a dialysis treatment, at least a blood glucose value of less than 70 mg/dl is measured in 9 of 10 patients and at least a blood glucose value of less than 55 mg/dl is measured in 4 of 10 patients. All of these hypoglycemic episodes were asymptomatic and could not have been recognized without specific monitoring. A particular risk results therefrom since hypoglycemia represents a risk factor for cardiovascular events such as strokes and for eye injuries and nerve damage in dialysis patients.

It is the object of the invention to reduce the frequency and intensity of glycemic episodes in dialysis patients.

Against this background, the invention relates to a system for carrying out a dialysis treatment using a dialysis machine, a control unit, and a sensor, wherein the sensor is in signal communication with the control unit, wherein the control unit is configured to measure the blood glucose level or the interstitial glucose value of a patient using the sensor during a dialysis treatment, to record a time progression of the blood glucose level or of the interstitial glucose values on the basis of the measurement values, and to automatically adapt one or more treatment parameters of the dialysis machine while taking the progression into account or to output instructions for a user-side adaptation of a treatment parameter or to output another user-side behavior.

Provision is therefore made within the framework of the invention to carry out a continuous monitoring of the blood glucose level of the patient (CGM=continuous glucose monitoring). Potential glycemic episodes of the patient, that is hypoglycemia or hyperglycemia, can thereby be recognized and taken into account in the current treatment or in future therapy prescriptions. CGM generally permits conclusions to be drawn on the glucose absorption ability specific to the patient so that a planning of the therapy prescription is made possible that is better aligned to the individual patient.

The adaptation of the treatment parameter or parameters of a current dialysis treatment or the output of corresponding instructions preferably takes place within the framework of the invention on the basis of progressions of the blood glucose level or of the interstitial glucose values that were determined as part of a past dialysis treatment.

The control unit is preferably part of the dialysis machine in the sense that it is installed therein.

The concept in accordance with the invention is suitable both for application to hemodialysis using a hemodialysis unit and for application to peritoneal dialysis using a peritoneal dialysis machine (a cycler). The therapy forms of actual hemodialysis, hemodiafiltration, and hemofiltration are here subsumed under the term of hemodialysis.

In a preferred embodiment, the control unit can be configured to furthermore obtain information on the body composition of the patient and to have this information enter into the automatic adaptation of the treatment parameters or into the output of corresponding information. The system can comprise its own sensors for determining the information on the body composition. The control unit can alternatively be configured to obtain this information via a user interface or an external device that is in communication with the system via an interface. Information on the body composition for example comprise information on the fat content or on the muscle mass of the patient. The control unit can in particular be configured to use information on the fluid status of the patient. The data can be currently determined data or historic data, but here preferably data updated at regular intervals.

The adaptation of the treatment parameters can inter alia comprise an adaptation of the glucose concentration of a dialysis solution administered to the patient. An automatic adaptation of the glucose concentration can, for example, take place at dialysis machines that perform an automatic preparation of the dialysis solution from concentrates. Alternatively, the patient or user can be prompted to supply a dialysis solution having a specific concentration to the dialysis machine for the treatment.

The adaptation of the treatment parameters can furthermore comprise an adaptation of the treatment performance. In the case of peritoneal dialysis, for example, the dwell time of the dialysis solution in the peritoneum of the patient during a cycle (the dwell time) can be adapted.

In an embodiment, the system furthermore comprises an apparatus for administering active ingredients to the patient and the adaptation of the treatment parameters comprises an administration of active ingredients to the patient. The apparatus for administering active ingredients to the patient can be integrated in the dialysis machine or can be present separately. Provision can, for example, be made that the system or the dialysis machine has an insulin pump and that insulin is administered to the patient in the event of an hyperglycemic episode or on a risk of a hyperglycemic episode. A dose of a diuretic can furthermore be provided if there is information on water retention levels being too high.

In a further embodiment, the control unit can be configured to obtain information on the plasma volume of the patient and to have this information enter into the automatic adaptation of the treatment parameters or into the output of corresponding information. This information plays a role as part of an application of the invention to hemodialysis. The system can either comprise its own sensors or can be configured to obtain information via a user interface or an external device to determine the corresponding information.

The adaptation of the treatment parameters can likewise comprise an adaptation of the ultrafiltration rate. This plays a role as part of hemodialysis.

The sensor for determining the blood glucose level of the patient can be an implant in an embodiment. The measurement of the blood glucose level therefore preferably takes place using an implanted sensor whose measurement values can be wirelessly accessed at the control unit of the system.

The blood sugar determination can also takes place non-invasively via the skin alternatively or additionally to an implanted sensor.

Enzymatic or also amperometric sensors are inter alia suitable as the sensors.

A further recommended action to the patient can furthermore include the indication of an insulin dose that is derived from the measurement values and that the patient applies e.g. by means of an insulin pen before starting the treatment.

Provision is made in an embodiment that the system furthermore has a user interface or an interface for data communication with an external device. The user interface is preferably part of the dialysis machine just like the control unit. The external device can, for example, be a smartphone or a computer. The interface can, for example, be configured for a wireless transmission of the data.

In an embodiment, the control unit is configured to display the instructions for an adaptation at the user side at a user interface or to transmit them to an external device.

Figure 2:
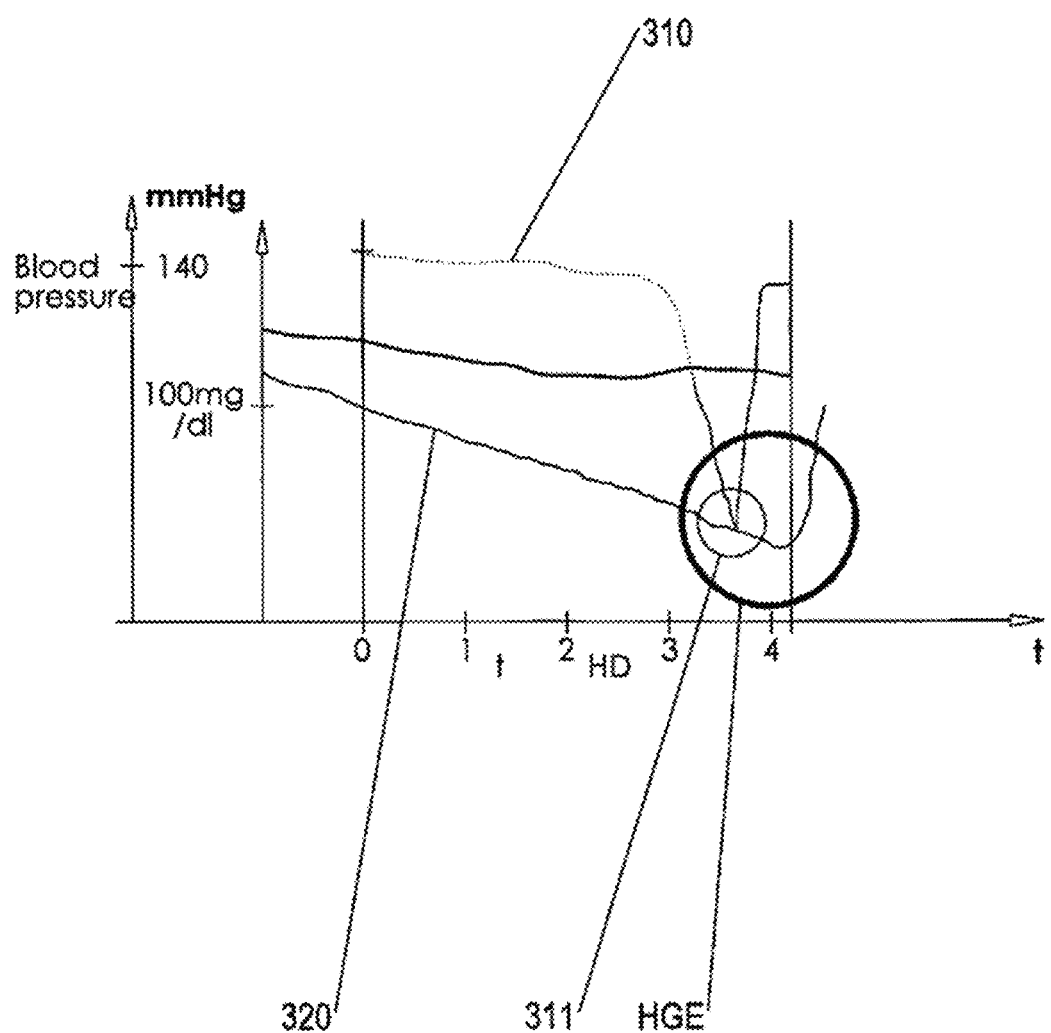

Further details and advantages of the invention result from the embodiments described in the following with reference to the Figures. There are shown in the Figures:

FIG. 1: a schematic representation of a workflow in the application of the invention to a peritoneal dialysis treatment; and FIG. 2: a diagram of exemplary progressions of the blood glucose level and the blood pressure during a hemodialysis treatment.

FIG. 1 relates to an application of the concept in accordance with the invention to peritoneal dialysis.

In a first step 100, a plurality of treatments 110, 120, and 130 are first carried out, with the treatment progressions 111, 121, and 131 corresponding to specified prescriptions 112, 122, and 132 and comprising a plurality of cycles each having an inflow phase, a dwell phase, and an outflow phase. The composition of the administered dialysis solution is likewise specified and can differ between cycles. Provision is made in agreement with the invention that the respective progressions 113, 123, and 133 of the blood glucose level or of the interstitial glucose values of the patient are determined during these treatments. In the exemplary case shown, hypoglycemic episodes HGE occur in all three treatments.

If, as in the exemplary case shown, it is found over a plurality of treatments 110, 120, and 130 by means of a continuous determination of the glucose level in the blood of the patient that said patient tends to hypoglycemic episodes HGE at regular intervals, the control unit of the machine lays down measures in a second step 200 to avoid such episodes HGE or to at least curb their occurrence and intensity to counteract them.

One measure 210 can be the adaptation of the prescription or treatment. The glucose concentration in the dialysis solution for one cycle (inflow-dwell-outflow) during which a hypoglycemic episode is to be expected on the basis of the data can, for example, be automatically increased to, for example, 4.25% glucose and/or the dwell time can be automatically reduced. A signal can, for example, also be output at a user interface of the device, said signal indicating to the user that a dialysis solution having a higher glucose concentration should be used or that the dwell time should be extended for the cycle in question.

The machine can furthermore take account of the fluid status 221, that is the extent of the water retention levels of the patient, in the adaptation of the treatment or a corresponding signal output as part of a possible measure 220. For example, in a patient having a comparatively low body water content or fluid status that is often accompanied by hypoglycemia, the therapy can be adapted such that two short cycles are carried out with a dialysis solution having a low glucose content and one following cycle is carried out with a dialysis solution having a higher glucose content. The adaptation can take place automatically or corresponding instructions can be output to the user. Alternatively, the dwell time can also be adapted.

If a patient tends to regular hyperglycemic episodes and correspondingly has a comparatively high body water content or fluid status, provision can be made as part of a further conceivable measure 230 to adapt the glucose content of the administered dialysis solutions on the basis of a continuous determination of the glucose content in the blood or of the interstitial glucose value and while additionally taking account of the fluid status such that hyperglycemic episodes are avoided. In addition to a decrease or increase of the glucose content of the dialysis solution, there is also the possibility of a partial or complete replacement of the glucose with icodextrin or other osmotica.

Instead of an adaptation of a treatment parameter such as a glucose content of the solution administered, instructions 240 can also be given to the patient that relate to his behavior before or during the therapy. The patient can, for example, be prompted to eat a snack prior to the start of the therapy.

If said measures are not sufficient or are predicted as insufficient to avoid a hyperglycemic episode, the control unit can be configured to initiate an insulin dose 250 by means of an insulin pump. Alternatively, the glucose can be replaced with icodextrin if an excessive increase of the fat content is observed.

In addition, the body fat content and the muscle mass as well as ultimately the lean tissue index (LTI) or the lean tissue mass (LTM) can be determined at regular intervals on the basis of a determination of the body composition of the patient (BCM—body composition measurement) to inter alia determine the dietary status of the patient. If it is found in this process that these parameters drop over time, a higher glucose concentration can be provided, optionally in combination with the dose of insulin, to support the buildup of body fat.

FIG. 2 relates to an application of the concept in accordance with the invention to hemodialysis.

The treatment parameters can also be adapted to avoid glycemic episodes in the patient in hemodialysis. In addition to the progression of the blood glucose level or of the interstitial glucose value and of the fluid status of the patient, in particular the plasma volume of the patient can here be used to adapt the treatment parameters, with the adaptation of the treatment parameters here in particular also being able to comprise an adaptation of the ultrafiltration rate.

A drop in blood pressure can, for example, occur during hemodialysis. The curve 310 of FIG. 2 shows an exemplary progression of the blood pressure. A drop 311 of the blood pressure is a typical symptom for the presence of a hypoglycemic episode HGE, with the blood pressure drop naturally also being able to have different causes such as a great reduction in plasma volume. The curve 320 of FIG. 2 shows an exemplary progression of the blood glucose level that in this case accompanies the drop of the blood pressure. Conclusions can at least be drawn on whether a drop of the blood glucose level could be the cause of the blood pressure drop or not using the continuous determination of the blood glucose level.

The invention claimed is:

1. A system configured for carrying out a plurality of peritoneal dialysis treatments on a patient, the system comprising a peritoneal dialysis machine, a control unit, and a sensor, wherein the sensor is in signal communication with the control unit, the peritoneal dialysis machine is configured to carry out, for each peritoneal dialysis treatment of the plurality of peritoneal dialysis treatments, a respective plurality of peritoneal dialysis cycles during the respective peritoneal dialysis treatment, each cycle of each respective plurality of peritoneal dialysis cycles comprising an inflow phase, a dwell phase, and an outflow phase, wherein:

for each peritoneal dialysis treatment of the plurality of peritoneal dialysis treatments each inflow phase of the respective plurality of peritoneal dialysis cycles comprises administering to the patient a respective dialysis solution having a respective composition including a respective glucose concentration, the respective dialysis solution being supplied to the peritoneal dialysis machine, each dwell phase of the respective plurality of peritoneal dialysis cycles lasts for a respective dwell time, and the respective plurality of peritoneal dialysis cycles comprises an initial cycle and a subsequent cycle;

for each peritoneal dialysis treatment of the plurality of peritoneal dialysis treatments, the control unit is configured to administer to the patient a first dialysis solution during the inflow phase of the respective initial cycle, the first dialysis solution having a first composition including a first glucose concentration, control the dwell time of the respective initial cycle to be a first dwell time, measure, with the sensor, over time, a blood glucose level or an interstitial glucose value, of the patient, during at least one cycle of the respective plurality of peritoneal dialysis cycles, to obtain measurement values, and record a respective time progression of the blood glucose level or of the interstitial glucose values on the basis of the obtained measurement values, by plotting a curve of the measurement values over time; and the control unit is configured to adapt one or more treatment parameters of the peritoneal dialysis machine, for a subsequent peritoneal dialysis treatment of the plurality of peritoneal dialysis treatments, based on the respective recorded time progression recorded for a past peritoneal dialysis treatment of the plurality of peritoneal dialysis treatments, wherein the adapting the one or more treatment parameters comprises (i) controlling the peritoneal dialysis machine to administer a second dialysis solution to the patient during the respective subsequent cycle of the respective plurality of peritoneal dialysis cycles of the subsequent peritoneal dialysis treatment, the second dialysis solution having a second glucose concentration that differs from the first glucose concentration, (ii) automatically controlling the dwell time of the dwell phase of the respective subsequent cycle of the respective plurality of peritoneal dialysis cycles of the subsequent peritoneal dialysis treatment, to be a second dwell time that differs from the first dwell time, or (iii) both (i) and (ii).

2. The system in accordance with claim 1, wherein the control unit is further configured to obtain body fluid status information on a body fluid status of the patient during a first peritoneal dialysis treatment of the plurality of peritoneal dialysis treatments on the patient, and to either (i) adapt a treatment parameter of the peritoneal dialysis machine for a subsequent peritoneal dialysis treatment of the plurality of peritoneal dialysis treatments on the patient, based on the body fluid status information, or (ii) output the body fluid status information to an external device.

3. The system in accordance with claim 1, wherein the control unit is configured to adapt one or more treatment parameters of the peritoneal dialysis machine for a subsequent peritoneal dialysis treatment of the plurality of peritoneal dialysis treatments, based on the recorded time progression recorded for a past peritoneal dialysis treatment of the plurality of peritoneal dialysis treatments, by controlling the peritoneal dialysis machine to administer a second dialysis solution to the patient during the subsequent cycle of the respective plurality of peritoneal dialysis cycles of the subsequent peritoneal dialysis treatment, the second dialysis solution having a second glucose concentration that differs from the first glucose concentration.

4. The system in accordance with claim 1, wherein the control unit is configured to adapt one or more treatment parameters of the peritoneal dialysis machine for a subsequent peritoneal dialysis treatment of the plurality of peritoneal dialysis treatments, based on the recorded time progression recorded for a past peritoneal dialysis treatment of the plurality of peritoneal dialysis treatments, by automatically controlling the dwell time of the dwell phase of the subsequent cycle of the respective plurality of peritoneal dialysis cycles of the subsequent peritoneal dialysis treatment, to be a second dwell time that differs from the first dwell time.

5. The system in accordance with claim 1, wherein the system furthermore comprises an apparatus for administering insulin, administering a diuretic, or administering both, to the patient, and the control unit is configured to administer, during the subsequent peritoneal dialysis treatment of the plurality of peritoneal dialysis treatments, insulin, a diuretic, or both, to the patient, based on a continuous determination of a glucose content in blood or of an interstitial glucose value.

6. The system in accordance with claim 1, wherein the control unit is configured to output instructions for a user-side adaptation of a treatment parameter for a subsequent peritoneal dialysis treatment of the plurality of peritoneal dialysis treatments, and either: (i) display the instructions for the user-side adaptation of the treatment parameter, at a user interface; or (ii) to transmit the instructions for the user-side adaptation of the treatment parameter, to an external device.

7. The system in accordance with claim 1, wherein the control unit is configured to measure, with the sensor, over time, the interstitial glucose value of a patient during a first peritoneal dialysis treatment of the plurality of peritoneal dialysis treatments carried out on the patient with the peritoneal dialysis machine, to obtain measurement values, the measurement values are interstitial glucose values, and the recorded time progression is a recorded time progression of the interstitial glucose values.

8. The system in accordance with claim 1, wherein the control unit is configured to measure, with the sensor, over time, the blood glucose level of patient during a first peritoneal dialysis treatment of the plurality of peritoneal dialysis treatments carried out on the patient with the peritoneal dialysis machine, to obtain measurement values, the measurement values are blood glucose level values, and the recorded time progression is a recorded time progression of the blood glucose level values.

9. The system in accordance with claim 5, wherein
the control unit is configured to measure, with the sensor, over time, the interstitial glucose value of a patient during a first peritoneal dialysis treatment of the plurality of peritoneal dialysis treatments carried out on the patient with the peritoneal dialysis machine, to obtain measurement values,
the measurement values are interstitial glucose values,
the recorded time progression is a recorded time progression of the interstitial glucose values, and
the control unit is configured to administer insulin, a diuretic, or both, to the patient, based on a continuous determination of the interstitial glucose values.

10. The system in accordance with claim 5, wherein
the control unit is configured to measure, with the sensor, over time, the blood glucose level of a patient during a first peritoneal dialysis treatment of the plurality of peritoneal dialysis treatments carried out on the patient with the peritoneal dialysis machine, to obtain measurement values,
the measurement values are blood glucose level values,
the recorded time progression is a recorded time progression of the blood glucose level values, and
the control unit is configured to administer insulin, a diuretic, or both, to the patient, based on a continuous determination of the blood glucose level values.

\* \* \* \* \*